United States Patent [19]
Chittofrati et al.

[11] Patent Number: 6,100,325
[45] Date of Patent: *Aug. 8, 2000

[54] FLUOROPOLYMER DISPERSIONS

[75] Inventors: Alba Chittofrati, Milan; Paolo Lazzari, Cagliari; Daria Lenti, Alessandria, all of Italy

[73] Assignee: Ausimont S.p.A., Milan, Italy

[ * ] Notice: This patent is subject to a terminal disclaimer.

[21] Appl. No.: 09/124,963

[22] Filed: Jul. 30, 1998

[30] Foreign Application Priority Data

Jul. 31, 1997 [IT] Italy .................. MI97A1832

[51] Int. Cl.⁷ .................. C08J 3/02; C08K 5/02; C08K 5/06; C08L 27/12
[52] U.S. Cl. .................. 524/546; 524/462; 524/463; 524/366; 523/339
[58] Field of Search .................. 524/544, 545, 524/546, 462, 463, 366, 805, 848; 210/639, 690, 691, 753, 773; 528/494, 495; 523/332, 336, 339

[56] References Cited

U.S. PATENT DOCUMENTS

| | | |
|---|---|---|
| 2,242,218 | 5/1941 | Auer . |
| 2,478,229 | 8/1949 | Berry .................. 524/546 |
| 3,037,953 | 6/1962 | Marks et al. .................. 524/546 |
| 3,301,807 | 1/1967 | Hoashi et al. .................. 524/376 |
| 3,665,041 | 5/1972 | Sianesi et al. . |
| 3,715,378 | 2/1973 | Sianesi et al. . |
| 4,284,518 | 8/1981 | Reick .................. 508/181 |
| 4,523,039 | 6/1985 | Lagow et al. . |
| 4,675,380 | 6/1987 | Buckmaster et al. . |
| 4,789,717 | 12/1988 | Giannetti et al. . |
| 4,864,006 | 9/1989 | Giannetti et al. . |
| 4,906,770 | 3/1990 | Marchionni et al. . |
| 5,051,158 | 9/1991 | Marchionni et al. . |
| 5,077,097 | 12/1991 | Moggi et al. .................. 427/393.6 |
| 5,294,248 | 3/1994 | Chittofrati et al. . |
| 5,532,310 | 7/1996 | Grenfell et al. . |
| 5,814,698 | 9/1998 | Montagna et al. .................. 524/544 |

FOREIGN PATENT DOCUMENTS

| | | |
|---|---|---|
| 0 075 312A2 | 3/1983 | European Pat. Off. . |
| 0 148 482A2 | 7/1985 | European Pat. Off. . |
| 0 247 379A1 | 12/1987 | European Pat. Off. . |
| 0 566 770 | 8/1993 | European Pat. Off. . |
| 0 633 274B1 | 1/1995 | European Pat. Off. . |
| 0 695 775A1 | 2/1996 | European Pat. Off. . |
| MI96A000442 | 3/1996 | Italy . |
| MI96A001411 | 7/1996 | Italy . |
| MI96A001412 | 7/1996 | Italy . |
| MI96A001785 | 8/1996 | Italy . |
| 1104482 | 2/1968 | United Kingdom . |
| 1226566 | 3/1971 | United Kingdom . |
| WO 93/22352 | 11/1993 | WIPO . |

OTHER PUBLICATIONS

Gerhartz, Wolfgang; Ulmann's Encyclopedia of Industrial Chemistry, VCH, Weinham, Germany (pp. 396–397 and 405–406), 1994.

Kirk, Raymond and Othmer, Donald; Encyclopedia of Chemical Technology, Interscience Publishing New York (p. 125), 1993.

Mark, H.F and Kroschwitz, Jacqueline I.; Encyclopedia of Polymer Science and Engineering, John Wiley and Sons, New York (pp. 581, 599, 610, and 624), 1989.

*Primary Examiner*—Vasu Jagannathan
*Assistant Examiner*—Callie E. Shosho
*Attorney, Agent, or Firm*—Arent Fox Kintner Plotkin Kahn

[57] ABSTRACT

Dispersions, obtained starting from a system formed by a (per)fluorinated polymer in polar solvent, comprising at least:

- 0.1–30% by weight of a polytetrafluoroethylene or of tetrafluoroethylene copolymers with other ethylenically unsaturated, totally or partially fluorinated, monomers;
- 50–99% by weight of fluorinated liquid;
- 0.01–5% by weight of surfactant selected from carboxylic acids with PFPE chain and nonionic surfactants having a perfluoroalkylic or perfluoropolyether chain with a oxyalkylenic repeating unit number lower than or equal to 6;
- polar solvent (water and/or alcohol) complement to 100; weight ratio lower than that of the initial system containing the (per)fluoropolymer used to prepare the dispersion.

12 Claims, No Drawings

FLUOROPOLYMER DISPERSIONS

The present invention relates to dispersions based on fluorinated oils and (per)fluorinated polymers, specifically tetrafluoroethylenepolymers (polytetrafluoroethylene PTFE) or tetrafluoroethylene copolymers with other ethylenically unsaturated, totally or partially fluorinated, monomers.

Such dispersions are prepared by mixing fluoropolymeric particulate in polar solvent (water and/or alcohol) with fluorinated liquid (oil) (perfluoropolyethers PFPE, or perfluorocarbons) in the presence of specific surfactants, such as to allow the segregation of a phase enriched in polar solvent and the consequent reduction of the polar content in the system.

In particular such dispersions are characterized in that they have a polar solvent/polymer weight ratio lower than that of the initial system.

It is known that homogeneous dispersions of fluorinated polymers in fluorinated "non-ozone depleting" liquids can be prepared according to U.S. Pat. No. 5,532,310.

This patent shows the use of these dispersions for obtaining fluoropolymeric coatings, underlining the need of reducing to a minimum the content of not much volatile polar solvents both for their negative effect on the coating uniformity and to minimize the corrosion and/or flammability problems. The dispersions according to this patent are formed by a fluoropolymer, a perfluorinated liquid, a polar solvent and a fluorinated surfactant selected from perfluoroaliphatic amidoalkanoles and PFPE chain acids or polymeric fluorinated surfactants obtained by polymerizing a fluorinated acrylic monomer with an hydrophilic monomer, for intance acrylic or methacrylic acid. The surfactant concentration ranges between 0.01 and 5% by weight. Preferably it must be as lowest as possible to avoid to leave residues on the treated surfaces. The surfactants are used to disperse 0.1–30% of polymer with reference to the final homogeneous composition weight. The dispersions stability, related to the polymer sedimentation in the emulsion, according to this patent is of at least 5–10 seconds, but only in few cases, among those exemplified, the polymer separation occurs after 10 minutes from the moment of the dispersion preparation.

In particular the dispersions are prepared by using surfactants which allow the complete emulsification of fluorinated polymers in polar solvents with fluorinated oils and show a polar solvent content, with reference to the amount of polymer, similar to that of the initial system.

However tests carried out by the Applicant have shown that some of the above mentioned surfactants allow a partial or complete separation of the polar solvent from the fluorinated system, thus substantially reducing the water and/or alcohol content with respect to the polymer amount.

The obtained dispersions generally have a some hour stability. Moreover the sediments result always redispersible, giving again homogeneous systems with a stability similar to that of the just prepared dispersions.

In addition to the applications as coatings, the dispersions formed by a fluorinated polymer, a fluorinated liquid of suitable viscosity, a polar solvent and a surfactant, can be used as additives for detergent and polishing compositions able to give high dirt-resistance to the treated surfaces. See for instance U.S. Pat. No. 5,294,248. The need was felt to have available (per)fluorinated polymer in fluorinated oil dispersions having a minimum polar solvent content, in particular with a polar solvent/polymer weight ratio lower than that present in the initial systems.

An object of the present invention is a dispersion, obtained starting from a system formed by a (per)fluorinated polymer in polar solvent, comprising at least:

0.1–30% by weight of a polytetrafluoroethylene or of tetrafluoroethylene copolymers with other ethylenically unsaturated, totally or partially fluorinated, monomers;

50–99% by weight of fluorinated liquid;

0.01–5% by weight of a surfactant selected from carboxylic acids with PFPE chain and nonionic surfactants having a perfluoroalkylic or perfluoropolyether chain with a number of oxyalkylenic repeating units lower than or equal to 6;

polar solvent (water and/or alcohol) complement to 100;

and characterized in that it has a polar solvent/polymer weight ratio lower than that of the initial system containing the (per)fluoropolymer used to prepare the dispersion.

By aqueous system or aqueous phase it is more generally meant water or hydroalcoholic mixtures.

As tetrafluoroethylene copolymers, the following ones can for instance be mentioned:

A) modified polytetrafluoroethylene containing small amounts, generally in the range 0.01–3% by moles, preferably in the range 0.05–0.5% by moles, of one or more comonomers selected from perfluroalkylperfluorovinylethers, such as for instance methylvinylether and propylvinylether; vinylidene fluoride; hexafluoroisobutene; chlorotrifluoroethylene; perfluoroalkylethylenes, such as for instance perfluoropropene;

B) tetrafluoroethylene (TFE) thermoplastic copolymers containing from 0.5 to 8% by moles of at least a perfluoroalkylvinylether, where the perfluoroalkylic radical has from 1 to 6 carbon atoms, such as for instance, TFE/perfluoropropylvinylether, TFE/perfluoromethylvinylether, TFE/perfluoroethylvinylether, TFE/perfluoroalkylethylene copolymers;

C) tetrafluoroethylene thermoplastic copolymers containing from 2 to 20% by moles of a perfluoroolefin $C_3$–$C_8$, such as for instance the TFE/hexafluoropropene copolymer, to which small amounts (lower than 5% by moles) of other comonomers having a perfluorovinylether structure can be added (as described for instance in the U.S. Pat. No. 4,675,380);

D) tetrafluoroethylene thermoplastic copolymers containing from 0.5 to 13% by weight of perfluoromethylvinylether and from 0.05 to 5% by weight of one or more fluorinated monomers selected in the group formed by:

1) $R_F$—O—CF=CF$_2$     (II)

wherein $R_F$ can be:
i) a perfluoroalkylic radical containing from 2 to 12 carbon atoms;

ii) —(CF$_2$—CF(CF$_3$) —O)$_r$—(CF$_2$)$_{r'}$—CF$_3$     (III)

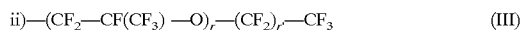

wherein r is an integer in the range 1–4 and r' is an integer in the range 0–3;

iii) —Z(OCF(X))$_q$(OCF$_2$—CF(Y))$_{q'}$—O—T     (IV)

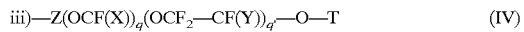

wherein the units (OCFX) and (OCF$_2$—CFY) are randomly distributed along the chain; T is a (per)fluoroalkylic radical from 1 to 3 C atoms, optionally containing one H or Cl atom; x and Y are equal to —F or —CF$_3$; Z represents —(CFX)—or—(CF$_2$—CFY)—;

q and q', equal to or different from each other, are integers in the range 0–10; the monomer average number molecular weight is in the range 200–2,000

2) $R_F$—CH=CH$_2$ (VII)

wherein $R_F$ has the meaning described in 1);
3) a perfluorodioxole of formula:

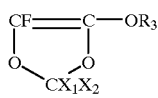

(VIII)

wherein $R_3$ is a perfluoroalkyl radical $C_1$–$C_5$, preferably —CF$_3$; $X_1$ and $X_2$ are, independently from each other, a fluorine atom or a perfluoroalkyl from one to three carbon atoms, preferably a —CF$_3$.

The preferred weight ratio of the three classes of monomers forming the tetrafluoroethylene/perfluoromethylvinylether/fluorinated monomers thermoplastic copolymers (D) is the following:

perfluoromethylvinylether: 2–9%;

fluorinated monomers: 0.1–1.5%;

tetrafluoroethylene: complement to 100%.

Among the formula (II) comonomers, perfluoroethylvinylether, perfluoropropylvinylether and perfluorobutylvinylether can for instance be mentioned. The preferred comonomer of this class is perfluoropropylvinylether.

The formula (III) comonomers are described, for instance, in the European Patent Application 75,312. Examples of these comonomers are those in which r can be 1 or 2 and r' is 2.

The formula (IV) comonomers are obtained by dechlorination of the compounds of formula:

CF$_2$Cl—CFCl—O—Z(CFXO)$_q$—(OCF$_2$—CFY)$_{q'}$—O—T which can be prepared as described in Example 11 of U.S. Pat. No. 4,906,770.

In the formula (VII) comonomers $R_F$—CH=CH$_2$, the radical $R_F$ preferably contains from 2 to 6 carbon atoms. Examples of these comonomers are perfluorobutylethylene and perfluorohexylethylene.

The above described fluorinated comonomers from (1) to (3) can be copolymerized with TFE and perfluoromethylvinylether singly to give terpolymers or in combination among each other to give tetrapolymers or copolymers having a higher constituent complexity.

The tetrafluoroethylene copolymers can be prepared by radical polymerization in aqueous medium. It results particularly suitable to carry out the polymerization in aqueous phase by using a perfluoropolyether dispersion or microemulsion according to the European Patent Application No. 247,379, or, preferably, as described in U.S. Pat. No. 4,864,006.

The preferred TFE (co)polymers to be used for preparing the present invention dispersion are TFE (PTFE) homopolymers or TFE copolymers with perfluoromethylvinylethers between 0.05 and 8% by moles, the latter are known as MFA perfluoropolymers.

The Melt Flow Index (MFI) is a common indicator of the average molecular weight of the polymer. The MFI (ASTM D1238-52T method) of the PTFE or of its copolymers can generally range between 0.1 and 30. However TFE (co) polymers with molecular weight up to 1,000,000 are also usable.

By initial system (per)fluoropolymer/polar solvent it is meant a (per)fluoropolymer dispersion in alcohol or latex obtained by the polymerization processes using water as reaction medium, preferably latexes obtained by emulsion, more preferably by microemulsion processes: see U.S. Pat. No. 4,864,006 and U.S. Pat. No. 4,789,717.

Such latexes have fluorinated polymer concentration generally in the range 20–50% by weight.

The fluorinated liquids of the present invention are the perfluoropolyethers generally having number average molecular weight from 250 to 5,000, preferably from 350 to 1,000; or liquid perfluorocarbons and mixtures thereof, optionally containing heteroatoms such as oxygen and nitrogen, generally having a carbon atom number in the range 5–18.

By perfluoropolyether liquid are meant compounds comprising fluorooxyalkylenic units selected from the following ones:

(CF$_2$CF$_2$O), (CF$_2$O), (CF$_2$CF(CF$_3$)O), (CF(CF$_3$)O), (CF$_2$CF$_2$CF$_2$O), (CF$_2$CF(OX$_3$)O) and (CF(OX$_3$)O), wherein $X_3$ is —(CF$_2$)$_n$CF$_3$ and n=0,1,2,3,4, said units being randomly distributed in the polymer chain. The T end groups are of fluoroalkylic type optionally containing 1 chlorine and/or H atom, for instance: —CF$_3$, —C$_2$F$_5$, —C$_3$F$_7$, ClCF$_2$CF(CF$_3$)—, CF$_3$CFClCF$_2$—, ClCF$_2$CF$_2$—, ClCF$_2$—, —CF$_2$H, —CF(CF$_3$)H.

Perfluoropolyethers of neutral type, i.e. having perfluoroalkylic end groups, which are selected from the following classes, can for instance be used:

(a$_1$) T$_1$—O(CF$_2$—CF(CF$_3$)O)$_a$(CFXO)$_b$—T$_2$
wherein:
T$_1$ and T$_2$, equal to or different from each other, can be —CF$_3$, —C$_2$F$_5$, —C$_3$F$_7$ groups, X is —F or —CF$_3$;
a, b are integers such that the molecular weight is in the above range.

These perfluoropolyethers are obtained according to the process described in UK 1,104,482 and with subsequent conversion of the terminal groups into unreactive groups according to UK 1,226,566.

(b$_1$) CF$_3$—O(CF$_2$CF$_2$O)$_c$(CF$_2$O)$_d$—CF$_3$
wherein:
c, d are integers such that the molecular weight is in the above range.

These PFPE are prepared by $C_2F_4$ photochemical oxydation according to U.S. Pat. No. 3,715,378.

(c$_1$) C$_3$F$_7$—O(CF(CF$_3$)—CF$_2$O)$_e$—T$_3$
wherein:
T$_3$ can be —C$_2$F$_5$, —C$_3$F$_7$; e is an integer such that the molecular weight is in the above range.

These compounds are prepared by ionic oligomerization of the hexafluoropropene epoxide and subsequent treatment of the acylfluoride (COF) with fluorine according to U.S. Pat. No. 2,242,218.

(d$_1$) T$_4$—O(CF$_2$—CF (CF$_3$)O)$_g$(C$_2$F$_4$O)$_h$(CFXO)$_i$—T$_5$
wherein:
T$_4$ and T$_5$, equal to or different from each other are perfluorinated groups —CF$_3$, —C$_2$F$_5$, —C$_3$F$_7$; X is —F or —CF$_3$; g, h, i, are integers such that the molecular weight is in the above range.

These products are obtained by C$_3$F$_6$, and C$_2$F$_4$ mixture photooxidation and subsequent treatment with fluorine acording to the process described in U.S. Pat. No. 3,665,041.

($e_1$) $T_6$—$O(CF_2CF_2CF_2O)_1$—$T_7$ wherein:

$T_6$, and $T_7$, equal to or different from each other, are —$CF_3$, —$C_2F_5$, —$C_3F_7$ groups; 1 is an integer such that the molecular weight is in the above range.

These products are obtained according to EP 148,482.

($f_1$) $T_8$—$O(CF_2CF_2O)_m$—$T_9$ wherein:

$T_8$ and $T_9$, equal to or different from each other, are —$CF_3$, —$C_2F_5$ groups; m is an integer such that the molecular weight is in the above range.

These products are obtained according to U.S. Pat. No. 4,523,039. The perfluoropolyethers with chlorinated end groups can be obtained for instance as described in U.S. Pat. No. 5,051,158. The perfluoropolyethers with hydrogenated end groups are prepared according to EP 695,775.

The preferred perfluoropolyethers are those of the ($a_1$), ($b_1$) and ($d_1$) classes.

The volatility and viscosity characteristics of the fluorinated liquid of each specific dispersion must be selected according to the requirements needed by the application system.

The present invention surfactants are the carboxylic acids with PFPE chain and the nonionic perfluoroalkylic or perfluoropolyether surfactants which are such as to allow, in the expected composition, a partial or complete separation of the polar solvent from the fluorinated system and allow the partial or complete transfer of the polymeric particulate in the fluorinated liquid.

The PFPE chains of the carboxylic acids have the same structures of the perfluoropolyether liquids ($a_1$), ($b_1$), ($c_1$), ($d_1$), ($e_1$), ($f_1$) previously defined; those with PFPE chains belonging to the ($a_1$), ($b_1$) and ($d_1$) classes are preferred. The fluorinated nonionic surfactants are formed by perfluoroalkylic or PFPE chains of the ($a_1$), ($b_1$), ($c_1$), ($d_1$), ($e_1$), ($f_1$) classes and polyoxyalkylenic chains with an oxyalkylenic repeating unit number lower than or equal to 6. Such surfactants can optionally contain heteroatoms such as, for instance, amidic trivalent nitrogen and hydroxylic groups. The fluorinated nonionic surfactants with perfluoroalkylic chain are described for instance in U.S. Pat. No. 5,532,310. Among the fluorinated nonionic surfactants with PFPE chain, with a number of oxyalkylenic repeating units lower than or equal to 6, the general structures reported in the EP 818,490, EP 818,849 and EP 826,714, which are incorporated herein by reference, can for instance be mentioned.

The above surfactants used in the composition according to the present invention can lead, on the basis of their sharing between polar solvent and fluorinated liquid, to partial or complete separation of the two liquid phases of the system.

The present invention preferred surfactants are those selected from the two above classes and such that, added to the dispersion, give an almost complete separation between a phase enriched in polar solvent and the oil phase (fluorinated liquid) and allow the partial or complete transfer of the polymeric particulate in the fluorinated liquid phase. They are easily identifiable by the skilled, since they are able to cause the separation of the two liquid phases, by transferring all or part of the (per)fluoropolymer in the lower fluorinated phase. The aqueous and/or alcoholic supernatant layer is therefore separated, substantially reducing the polar solvent/polymer weight ratio in the fluorinated liquid with reference to that of the preparations with the same fluoropolymer content, obtained according to the art, starting from the same initial system.

By decreasing the polar solvent/polymer ratio in the invention compositions with reference to that of the initial aqueous and/or alcohol dispersion, the problems connected with the polar solvent presence, such as for instance the corrosion as regards water and flammability as to alcohol, are also reduced.

This represents a remarkable advantage with reference to the dispersions according to U.S. Pat. No. 5,532,310 in which the content of polar solvent with reference to the polymer remains the same of the starting dispersion. In this patent, for instance, to try to overcome the drawbacks connected with the presence of the polar solvent, a 30% by weight of fluoropolymer commercial dispersion in the polar solvent was diluted with fluorinated liquid until reaching a polymer concentration of 1.5% by weight. The composition was thus formed by 95% of fluorinated liquid and by about 3.5% of polar solvent. The problem of the high amount of polar solvent in the dispersions is not easily overcomeable directly starting from the (per)fluoropolymer dry powder, since systems with a worse dispersion degree due to the presence of coagula would be obtained, therefore with clearly lower stability and more difficult to be redispersed.

It is therefore a further object of the present invention a process to obtain the dispersions as above defined of fluorinated polymers in fluorinated liquids, characterized in that it comprises at least the following steps:

a') the surfactants as above defined, in an amount from 50 to 500 mg per gram of polymer, preferably from 100 to 300 mg, are added to TFE-based (per)fluoropolymer matrixes in water and/or alcohol;

b') the polar solvent dispersion with surfactants is mixed with a perfluoropolyether or fluorocarbon liquid, as above defined, such that the ratio by weight polymer/fluorinated liquid is lower than 0.7, preferably in the range 0.5–0.1;

c') decantation with partial or total separation of the phase enriched in polar solvent from the fluorinated liquid one and recovery of a mixed phase fluorinated dispersion polar solvent/oil having a reduced weight ratio polar solvent/polymer with reference to the initial system.

In practice in stage c') the supernatant phase (aqueous and/or alcohol phase) is removed and the lower fluorinated dispersion containing the fluoropolymer is used.

Instead of the perfluoropolyethers mentioned at point b'), compounds of the same class in which one or both the end groups contain an hydrogen atom, can be used. For these compounds see EP 805,199 in the name of the Applicant.

Preferably the (per)fluoropolymer/polar solvent system which is used in the above described process is obtained by a gelling process of aqueous latexes, neutralization and subsequent gel dispersion.

The gelling process is characterized in that it comprises at least the following passages:

a") gel formation by addition of electrolytes. In the case of uni-univalent inorganic electrolytes the necessary concentration to have complete gelling is higher than $10^{-3}$ molar in the gel. Uni-univalent inorganic electrolytes, for instance nitric acid or preferably sodium-nitrate, are preferably used. With nitric acid gelling takes place preferably at a pH in the range 0.5–2.

The formation of gel can be obtained by depositing the electrolyte solution on the latex surface in static conditions, or under mild stirring, in order to avoid coagulation phenomena.

b") preferably gel neutralization at a final pH 6–7 with diluted alkaline solutions (e.g. NaOH $10^{-4}$M), and optionally subsequent washing with water;

c") gel redispersion with the invention surfactants.

The surfactants can be added to the gel both as such if liquid, or in solution and/or aqueous or hydroalcoholic dispersion, at a concentration in the range 10–90% by weight.

The necessary surfactant amount to redisperse the gel is in the range 50–500 mg per gram of polymer.

The use of a"), b") and c") steps in the process for obtaining the invention fluorinated dispersions is preferred since it allows an higher yield in the TFE-based polymer transfer from the aqueous phase to the fluorinated organic one (step c').

The following examples are given for illustrative purposes of the present invention and are not limitative of the same.

EXAMPLE 1

The used latex contained a terpolymer formed by TFE-FMVE-FPVE in molar ratio 96.15-3.5-0.35 and was prepared according to the process described in Example 1 of EP 633,274. The polymer particle sizes were of 75 nm (average diameter). The obtained latex had a polymer concentration of 19.3% by weight.

440 g of latex were placed in a 1 l glass cylinder and acidified by introduction from the top of 13.6 ml of nitric acid 6.8 M, with formation of about 400 ml of a gel phase at pH=1. The polymer content in the gel phase was of 19% by weight.

To 25 g of gel, corresponding to 4.75 g of polymer, 0.35 g of a carboxylic acid were added, having an average molecular weight of 426 and a perfluoropolyether chain $R_{F1}$:

$R_{F2}O(CF_2—CF(CF_3)O)_n(CF(CF_3)O)_p(CF_2O)_m CF_2$, wherein $R_{F2}$ is $ClC_3F_6$, obtaining, under mild stirring, the polymer redispersion in water.

To the disperison 19 g of Galden® HT90 (Ausimont), belonging to class $a_1$), were added, having boiling point of 90° C. and viscosity of 0.75 cSt at 25° C., to have a polymer/fluorinated liquid weight ratio of 0.25. Under mild stirring, the polymer particles transferred from the aqueous phase to the fluorinated oil. The supernatant aqueous phase was taken after about 4 hours of decantation.

99.2% of the polymer initially present in the aqueous phase resulted transferred in the fluorinated liquid, which contained also 1.1% of surfactant referred to the weight of the final dispersion based on Galden® HT90. The surfactant present in the fluorinated dispersion formed 80% of the amount initially added to the aqueous polymeric gel.

The final dispersion had moreover a water content, determined by Karl Fischer titration, of 1.2% by weight and contained 19.4% by weight of polymer.

The polymer resulted stably dispersed in Galden® HT90, without any variation of the dispersion aspect for over 24 hours. After 3 days dispersion ageing, a small separation of Galden® HT90 was noted on the surface, the amount by weight of the separated fluorinated liquid resulted of 2.2% with reference to the total fluorinated liquid in the system. However also after a prolonged ageing a mild dispersion stirring was sufficient to completely restore the homogeneity.

EXAMPLE 2

Example 1 was repeated, in the same conditions and with the same materials, by replacing Galden® HT90 with the same amount of Galden® DO2 belonging to the class $a_1$), having boiling point of 175° C. and viscosity of 1.8 cSt at 25° C.

The final dispersion had the same composition (19.4% polymer, 1.1% surfactant and 1.2% of residual water in Galden® DO2) and the same stability during the time (unchanged after 24 hours) of the dispersion of Example 1.

EXAMPLE 3

Example 1 was repeated, in the same conditions and with the same materials, by replacing Galden® HT90 with a similar amount of a perfluoropolyether belonging to the class $a_1$), with a content of partially hydrogenated end groups such as to have 855 ppm of hydrogen. The perfluoropolyether had an average molecular weight of 390, viscosity of 0.53 cSt at 20° C. and boiling point of 70° C.

The final dispersion had the same composition (including the content of residual water lower than 2% on the total weight of the dispersion) and the same stability during the time (unchanged after 24 hours) of the dispersions obtained in Examples 1–2.

EXAMPLE 4

Example 1 was repeated, in the same conditions and with the same materials, by replacing Galden® HT90 with a similar amount of a perfluoropolyether belonging to the class $b_1$), with a content of partially hydrogenated end groups such as to have 8620 ppm of hydrogen. The perfluoropolyether had an average molecular weight of 233, viscosity of 0.4 cSt at 20° C., boiling point of 40–60° C.

The final dispersion had the same composition (including the content of residual water lower than 2%) and the same stability during the time (unchanged after 24 hours) of the dispersions obtained in Examples 1–3.

EXAMPLE 5

Example 1 was repeated, in the same conditions and with the same materials, by replacing Galden® HT90 with a similar amount of a mixture perfluoro 2-butyltetrahydrofurane/perfluoro n-octane 3:7 weight/weight (viscosity 0.81 cSt at 25° C., boiling point 104° C.).

The final dispersion had the same composition (including the content of residual water lower than 2%) and the same stability during the time (unchanged after 24 hours) of the dispersions obtained in Examples 1–3.

EXAMPLE 6 (comparative)

Example 1 was repeated by using the same compounds under the same conditions, but replacing the carboxylic acid having perfluoropolyether chain with 0.48 g of the nonionic surfactant of formula: $R_{F3}—CH_2—(OCH_2CH_2)_{5.5}—OH$, wherein $R_{F3}$, having an average molecular weight of 650, is a PFPE chain similar to $R_{F1}$. The surfactant was not added as such, but in solution water/isopropanol 4:1 (weight/weight) at 25%. When Galden® HT90 was added there was no separation in this case between fluorinated and aqueous phase but, on the contrary, a complete emulsification was obtained. The obtained system did not change during the time, also after 4 days the emulsion remained unchanged.

The emulsion composition (% by weight) was the following: 10.4% polymer, 41.4% Galden® HT90, 1% nonionic surfactant, 0.6% isopropanol, 46.6% water.

EXAMPLE 6

A latex of TFE/FMVE/FPVE terpolymer was used similar to that used in Example 1, but with a polymer content of 32.2% by weight. Under mild stirring the following amounts of the different components were mixed: 4.59 g of latex, 3.27 g of a carboxylic acid with PFPE chain having a structure similar to that used in Example 1 but with an average molecular weight of 525, 92.14 g of Galden® HT90.

What is claimed is:

1. A dispersion, suitable for use as a coating or as an additive for detergent and polishing compositions of dispersions, resulting from an initial system formed by a (per)fluorinated polymer in polar solvent, comprising:
   0.1–30% by weight of a polytetrafluoroethylene or a copolymer of tetrafluoroethylene with other ethylenically unsaturated, totally or partially fluorinated, monomers;
   50–99% by weight of perfluoropolyethers having number average molecular weight from 250 to 5,000, or liquid perfluorocarbons and mixtures thereof, optionally containing heteroatoms selected from oxygen and nitrogen;
   0.01–5% by weight of surfactant selected from carboxylic acids with PFPE chain and nonionic surfactants having a perfluoroalkylic or perfluoropolyether chain with a number of oxyalkylenic repeating units lower than or equal to 6;
   polar solvent complement to 100% by weight;
   wherein said dispersion has a polar solvent/polymer weight ratio lower than that of said initial system containing the (per)fluoropolymer used to prepare the dispersion.

2. The dispersion according to claim 1 wherein the tetrafluoroethylene copolymers are selected from:
   A) modified polytetrafluoroethylene containing small amounts, generally in the range 0.01–3% by moles, of one or more comonomers selected from perfluroalkylperfluorovinylethers, vinylidene fluoride; hexafluoroisobutene; chlorotrifluoroethylene; perfluoroalkylethylenes;
   B) tetrafluoroethylene (TFE) thermoplastic copolymers containing from 0.5 to 8% by moles of at least a perfluoroalkylvinylether, where the perfluoroalkylic radical has from 1 to 6 carbon atoms,
   C) tetrafluoroethylene thermoplastic copolymers containing from 2 to 20% by moles of a perfluoroolefin $C_3$–$C_8$, optionally containing amounts lower than 5% by moles of other comonomers having a perfluorovinylether structure;
   D) tetrafluoroethylene thermoplastic copolymers containing from 0.5 to 13% by weight of perfluoromethylvinylether and from 0.05 to 5% by weight of one or more fluorinated monomers selected from the group consisting of
   1)

$R_FO-CF=CF_2$                           (II)

wherein $R_F$ can be:
   i) a perfluoroalkylic radical containing from 2 to 12 carbon atoms;
   ii)

$-(CF_2-CF(CF_3)-O)_r-(CF_2)_{r'}-CF_3$       (III)

wherein r is an integer in the range 1–4 and r' is an integer in the range 0–3;
   iii)

$-Z(OCF(X))_q(OCF_2-C$                     (IV)

wherein the units (OCFX) and ($OCF_2$—CFY) are randomly distributed along the chain; T is a (per)fluoroalkylic radical from 1 to 3 C atoms, optionally containing one H or Cl atom; X and Y are equal to —F or —$CF_3$; Z represents —(CFX)— or —($CF_2$—CFY)—;
   q and q', equal to or different from each other, are integers in the range 0–10;
   the monomer average number molecular weight is in the range 200–2,000;
   2)

$R_F-CH=CH_2$                                   (VII)

wherein $R_F$ has the meaning described in 1);
   3) a perfluorodioxole of formula:

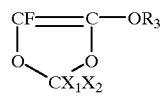
                                             (VIII)

wherein $R_3$ is a perfluoroalkyl radical $C_1$–$C_5$, $X_1$ and $X_2$ are, independently from each other, a fluorine atom or a perfluoroalkyle from one to three carbon atoms.

3. The dispersion according to claim 1 wherein the TFE (co)polymers are the TFE (PTFE) homopolymers or the TFE copolymers with perfluoromethylvinylether between 0.05 and 8% by moles.

4. The dispersion according to claim 1, wherein the (per)fluoropolymer/polar solvent initial system is a (per)fluoropolymer dispersion in alcohol or latex obtained from the polymerization processes using water as reaction medium.

5. The dispersion according to claim 1, wherein the perfluoropolyethers weight from 250 to 5,000, optionally containing heteroatoms such as oxygen and have a number of carbon atoms in the range 5–18.

6. The dispersion according to claim 5, wherein the perfluoropolyether liquid comprises fluorooxyalkylenic units selected from the group consisting of
   ($CF_2CF_2O$), ($CF_2O$), ($CF_2CF(CF_3)O$), ($CF(CF_3)O$), ($CF_2CF_2CF_2O$), ($CF_2CF(OX_3)O$) and ($CF(OX_3)O$),
   wherein $X_3$ is —($CF_2$)$_n$$CF_3$ and n =0,1,2,3,4, said units being randomly distributed in the polymer chain, the T end groups are of fluoroalkylic type optionally containing 1 chlorine and/or H atom, preferably —$CF_3$, —$C_2F_5$, —$C_3F_7$, $ClCF_2CF(CF_3)$—, $CF_3CFClCF_2$—, $ClCF_2CF_2$—, $ClCF_2$—, —$CF_2H$, —$CF(CF_3)H$.

7. The dispersion according to claim 1, wherein the surfactants are such as to allow a partial or complete separation of the polar solvent from the fluorinated system and they allow the partial or complete transfer of the polymeric particulate in the fluorinated liquid.

8. The dispersion according to claim 7, wherein the PFPE chains of the carboxylic acids have the same structures of the perfluoropolyether liquids; the fluorinated nonionic surfactants are formed by perfluoroalkylic or PFPE chains and polyoxyalkylenic chains, optionally the nonionic surfactants contain heteroatoms selected from amidic trivalent nitrogen and hydroxylic groups.

9. Process to obtain the dispersion according to claim 1, characterized in that it comprises at least the following steps:
   a') the surfactants in an amount from 50 to 500 mg per gram of polymer, are added to (per)fluoropolymer matrixes which utilize TFE in water and/or alcohol;

b') the polar solvent dispersion with the surfactants is mixed with the perfluoropolyether or fluorocarbon liquid, such that the polymer/fluorinated liquid by weight ratio is lower than 0.7, c') decantation with partial or total separation of the phase enriched in polar solvent from the fluorinated liquid one and recovery of a fluorinated dispersion in mixed phase polar solvent/oil with a reduced polar solvent/polymer weight ratio with reference to the initial system; removal of the supernatant phase (aqueous and/or alcohol phase) and use of the the lower fluorinated dispersion phase below containing the fluoropolymer.

10. Process according to claim 9, wherein instead of the perfluoropolyethers mentioned at point b'), compounds of the same class are used in which one or both the end groups contain an hydrogen atom.

11. Process according to claim 9, wherein the used (per)fluoropolymer/polar solvent system is obtained by a gelling process of aqueous latexes, neutralization and subsequent gel dispersion.

12. Process according to claim 11, wherein the gelling process comprises at least the following steps:

a") gel formation by addition of electrolytes;

b") preferably gel neutralization at a final pH 6–7 with diluted alkaline solutions, and optionally subsequent washing with water;

c") gel redispersion with the surfactants above defined.

* * * * *